(12) United States Patent
Ono

(10) Patent No.: US 10,013,609 B2
(45) Date of Patent: Jul. 3, 2018

(54) IMAGE CAPTURING APPARATUS AND IMAGE PROCESSING METHOD

(71) Applicant: CANON KABUSHIKI KAISHA, Tokyo (JP)

(72) Inventor: Mitsuhiro Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/223,215

(22) Filed: Jul. 29, 2016

(65) Prior Publication Data
US 2017/0039411 A1 Feb. 9, 2017

(30) Foreign Application Priority Data

Aug. 7, 2015 (JP) ................. 2015-157506

(51) Int. Cl.
| | |
|---|---|
| G06K 9/00 | (2006.01) |
| H04N 7/18 | (2006.01) |
| A61B 3/00 | (2006.01) |
| G03B 29/00 | (2006.01) |
| H04N 5/33 | (2006.01) |
| H04N 5/232 | (2006.01) |
| G06K 9/62 | (2006.01) |
| G06K 9/46 | (2006.01) |

(52) U.S. Cl.
CPC ....... *G06K 9/0061* (2013.01); *G06K 9/00255* (2013.01); *G06K 9/629* (2013.01); *H04N 5/23219* (2013.01); *H04N 5/332* (2013.01); *G06K 9/00281* (2013.01); *G06K 9/00604* (2013.01); *G06K 9/4652* (2013.01); *G06K 9/4661* (2013.01)

(58) Field of Classification Search
USPC ........... 382/162, 117; 348/78, 156; 351/200; 396/18
See application file for complete search history.

(56) References Cited

U.S. PATENT DOCUMENTS 5,867,587 A * 2/1999 Aboutalib .............. G08B 21/06
340/576
6,496,594 B1 * 12/2002 Prokoski .............. A61B 5/1176
382/118

(Continued)

FOREIGN PATENT DOCUMENTS

| JP | 09/251534 A | 9/1997 |
| JP | 2014-079495 A | 5/2014 |

OTHER PUBLICATIONS

M.A.Turk et al. "Face Recognition Using Eigenfaces", Proc. of IEEE Conf. on Computer Vision and Pattern Recognition, pp. 586-591, 1991.

*Primary Examiner* — Kathleen Y Dulaney
(74) *Attorney, Agent, or Firm* — Cowan, Liebowitz & Latman, P.C.

(57) ABSTRACT

An image capturing apparatus that can capture a visible light image and an infrared light image of the same object, the image capturing apparatus comprises a detection unit configured to detect a predetermined object in the visible light image, an extraction unit configured to extract feature information of a specific portion in the object detected in the infrared light image by the detection unit, and an estimation unit configured to estimate unique information of the predetermined object using the feature information extracted by the extraction unit.

9 Claims, 5 Drawing Sheets

(56) References Cited

U.S. PATENT DOCUMENTS

| | | | | |
|---|---|---|---|---|
| 8,213,782 B2* | 7/2012 | Jelinek | G02B 7/36 382/117 |
| 2002/0136435 A1* | 9/2002 | Prokoski | G06K 9/00221 382/118 |
| 2003/0012425 A1* | 1/2003 | Suzuki | G02B 27/0093 382/154 |
| 2003/0123711 A1* | 7/2003 | Kim | G06K 9/00597 382/117 |
| 2003/0174211 A1* | 9/2003 | Imaoka | G06K 9/00597 348/156 |
| 2008/0037835 A1* | 2/2008 | Lee | G06K 9/00604 382/117 |
| 2009/0016574 A1* | 1/2009 | Tsukahara | A61B 5/117 382/117 |
| 2010/0091285 A1* | 4/2010 | Newcomb | G01N 21/255 356/408 |
| 2011/0052009 A1* | 3/2011 | Berkovich | G02B 27/01 382/106 |
| 2012/0230545 A1* | 9/2012 | Zhang | G06K 9/00221 382/103 |
| 2012/0293629 A1* | 11/2012 | Min | G06K 9/00604 348/46 |
| 2013/0222564 A1* | 8/2013 | Park | G06K 9/2027 348/77 |
| 2013/0243274 A1* | 9/2013 | Sukegawa | G06K 9/00221 382/118 |
| 2013/0329079 A1* | 12/2013 | Florea | G06K 9/00221 348/222.1 |
| 2014/0099005 A1* | 4/2014 | Mogi | G06K 9/00288 382/118 |
| 2015/0379348 A1* | 12/2015 | Whritenor | G06K 9/00597 382/117 |
| 2016/0117554 A1* | 4/2016 | Kang | H04N 13/0014 348/78 |

* cited by examiner

IMAGE CAPTURING APPARATUS AND IMAGE PROCESSING METHOD

BACKGROUND OF THE INVENTION

Field of the Invention

The present invention relates to an apparatus capable of capturing visible light images and infrared light images.

Description of the Related Art

As a conventional image capturing apparatus capable of performing visible light shooting and infrared shooting, Japanese Patent Laid-Open No. 2014-79495 describes a technique for estimating an iris color and a race from the luminance value of the iris of an eye of a person as an object in an infrared light image.

For monitoring cameras and the like, it is an important function to extract and record feature information of a person from a captured image. However, it is difficult to extract feature information of an eye portion from an image that includes a person whose eyes are hidden by sunglasses or the like. In this case, by using an image sensor that can shoot infrared light images, it becomes possible to capture an image of the eye portion of even a person whose eyes are hidden by sunglasses or the like. However, it is not possible to extract unique biological information such as an iris color from the image because the image is not a visible light image.

Also, Japanese Patent Laid-Open No. 2014-79495 above describes a technique for estimating an iris color and a race from the luminance value of the iris, but it is envisioned that the technique is used in a medical field, and the iris color is estimated from an image shot with uncovered eyes without sunglasses or the like worn thereon, and thus it is not envisioned that the technique is used for shooting a person wearing sunglasses or the like. Therefore, in the case where sunglasses or the like are worn and the luminance value of infrared light components changes, the luminance value of the iris also changes, and the color of the iris cannot be estimated.

SUMMARY OF THE INVENTION

The present invention has been made in consideration of the aforementioned problems, and realizes a technique for making it possible to estimate unique information of an object from an image in which the object is captured, even in a state where a specific portion of the object is shielded from light.

In order to solve the aforementioned problems, the present invention provides an image capturing apparatus that can capture a visible light image and an infrared light image of the same object, the image capturing apparatus comprising: a detection unit configured to detect a predetermined object in the visible light image; an extraction unit configured to extract feature information of a specific portion in the object detected in the infrared light image by the detection unit; and an estimation unit configured to estimate unique information of the predetermined object using the feature information extracted by the extraction unit.

In order to solve the aforementioned problems, the present invention provides an image processing method of an apparatus that can capture a visible light image and an infrared light image of the same object, the method comprising: detecting a predetermined object in the visible light image; extracting feature information of a specific portion in the object detected in the infrared light image; and estimating unique information of the predetermined object using the extracted feature information.

In order to solve the aforementioned problems, the present invention provides a non-transitory computer-readable storage medium storing a program for causing a computer to execute an image processing method of an apparatus that can capture a visible light image and an infrared light image of the same object, the method comprising: detecting a predetermined object in the visible light image; extracting feature information of a specific portion in the object detected in the infrared light image; and estimating unique information of the predetermined object using the extracted feature information.

According to the present invention, even in a state where a specific portion of an object is shielded from light, unique information of the object can be estimated from an image in which the object is captured, and authentication accuracy can be improved.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

An embodiment in which an image capturing apparatus of the present invention is applied to a digital camera for shooting still images and moving images, for example, will be described below, but the image capturing apparatus of the present invention can be applied to other monitoring cameras and the like.

Apparatus Configuration

Figure 1:
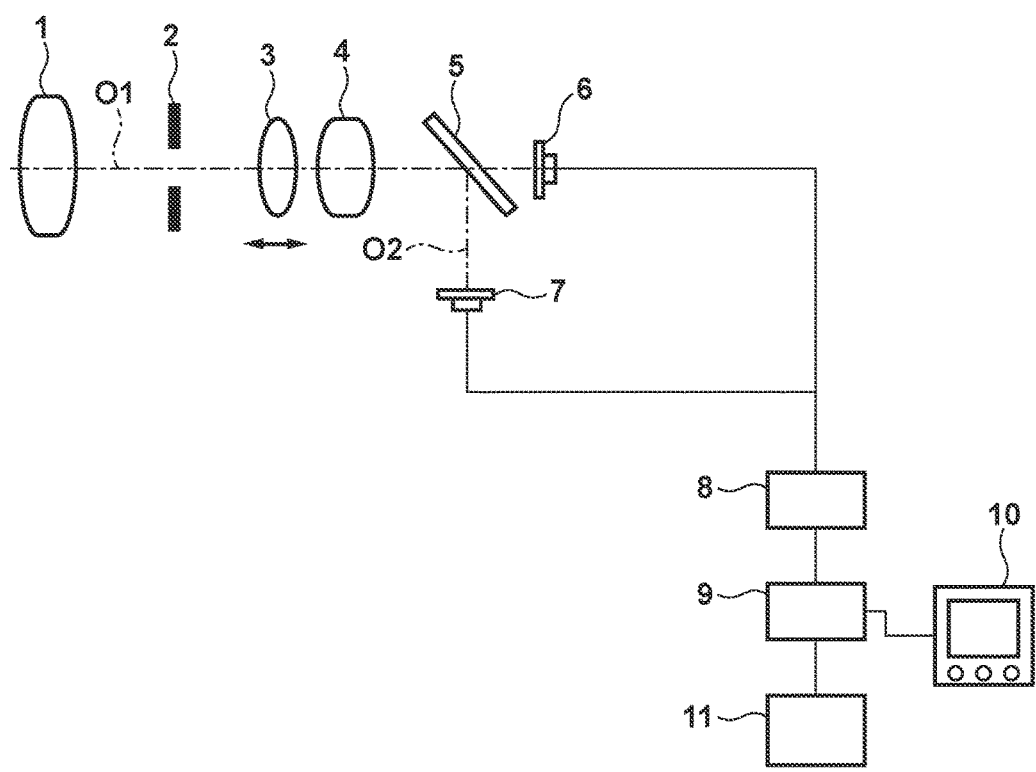
FIG. 1 is a block diagram showing an apparatus configuration of an embodiment of the present invention.

An outline of the configuration and functions of a digital camera of the embodiment according to the present invention will be given below with reference to FIG. 1.

The digital camera of this embodiment has an objective lens 1, a shooting diaphragm 2, a focus lens 3 and a shooting lens 4 that are sequentially arranged on an optical axis O1, and has a dichroic mirror 5 for wavelength separation arranged downstream thereof. The dichroic mirror 5 has a structure for reflecting infrared light while transmitting visible light. Visible light components that passed through the dichroic mirror 5 are photoelectrically converted by a visible light image sensor 6 arranged downstream of the dichroic mirror 5 so as to generate visible light image signals. Meanwhile, infrared light components reflected by the dichroic mirror 5 are photoelectrically converted by an infrared light image sensor 7 constituted by a CMOS or the like arranged on an optical axis O2 so as to generate infrared light image signals.

Figure 2:
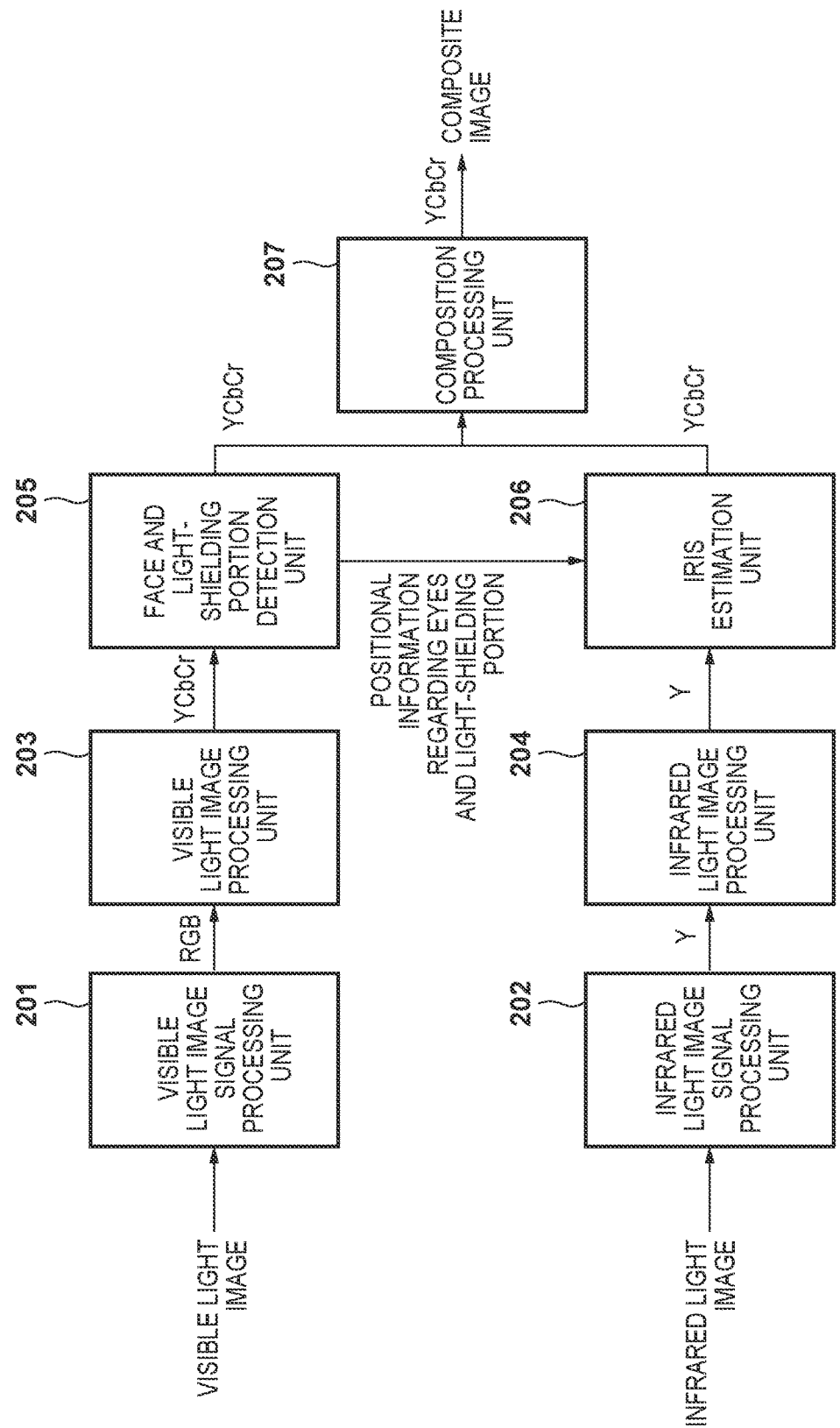
FIG. 2 is a block diagram showing a configuration of an image processing unit in FIG. 1.

Moreover, the image signals output from the image sensor 6 for capturing a visible light image and the image sensor 7 for capturing an infrared light image are subjected to signal processing and image processing, which will be described later with reference to FIG. 2, by an image processing unit 8, and are output to a control unit 9. The control unit 9 has a CPU, a memory and the like, and controls the overall operations of the camera. A monitor 10 that has an operation unit for accepting user operations, and a recording unit 11 for recording image data are connected to the control unit 9. The recording unit 11 is a memory card or a hard disk incorporated in or removable from the camera. The image processing unit 8 detects the face of a person as a predetermined object in a visible light image captured by the visible light image sensor 6, and detects a shielding portion such as sunglasses. The image processing unit 8 also extracts luminance information of the pupil, iris and sclera of an eye included in the face of the person as feature information of specific portions in the face of the person in an infrared light image captured by the infrared light image sensor 7. Furthermore, the image processing unit 8 estimates unique biological information such as an iris color and a race from the relationship between the luminance information of the pupil, iris and sclera of the eye included in the face of the person. The image processing unit 8 then generates a composite image that is obtained by adding the color of the iris of the eye estimated from the infrared light image captured by the infrared light image sensor 7 to the eye region included in the face of the person in the visible light image, and outputs the composite image to the control unit 9. The control unit 9 outputs composite images to the monitor 10 as appropriate so as to display a video image, and at the same time, outputs the composite images to the recording unit 11 so as to record the composite images.

By performing person authentication (biometrics) using a composite image obtained in this manner, it becomes possible to improve person authentication accuracy even with a face image in which the eyes are hidden by sunglasses or the like. Note that person authentication may be performed by the control unit 9, or may be performed by an external apparatus connected via a network, which will be described later. Note that person authentication is performed by storing authentication data to memories in advance, and comparing the authentication data to the composite image. As a result of the comparison, if the degree of similarity between the person in the image and the authentication target is larger than or equal to a predetermined amount, it is determined that the person in the image matches the authentication target. Here, the determination result may include not only whether or not the person in the image is authenticated, but also the degree of similarity when the comparison was performed, and the like.

Here, the visible light image sensor 6 and the infrared light image sensor 7 are arranged at a substantially conjugate positions, but the infrared light image sensor 7 is arranged so as to be shifted rearward on the optical path in order to absorb the deviation of the focal position caused by a wavelength difference. Note that the infrared light image sensor may be a two-wavelength infrared ray sensor capable of capturing far infrared rays and near infrared rays in addition to infrared rays (mid infrared rays).

Furthermore, the digital camera of this embodiment has an illumination light source (not illustrated) constituted by an LED light source for emitting near infrared light or the like.

The control unit 9 can be connected to an external device such as an external storage or an external computer, and can transfer a shot image to the external device. It is also possible to control the start and end of shooting using the external device.

Note that a communication unit may further be connected to the control unit 9. In this case, the communication unit can output image data generated by the image processing unit 8 to an external apparatus, an external monitor and the like that are placed at a distant location, via a wireless network, a wired network or another network.

According to the above configuration, it becomes possible to capture a visible light image and an infrared light image of the same object at the same time. In addition, a visible light image and an infrared light image can be captured at substantially the same angle of view.

Configuration of Image Processing Unit

Next, the detailed configuration and processing flow of the image processing unit 8 in FIG. 1 will be described with reference to FIG. 2.

First, visible light image processing blocks and a signal processing flow in the image processing unit 8 will be described.

Visible light image signals output from the visible light image sensor 6 are separated into RGB signals by a visible light image signal processing unit 201, and are output to a visible light image processing unit 203. The visible light image processing unit 203 executes image processing such as gamma correction and color space conversion on the RGB signals, generates YCbCr luminance color difference signals, and outputs the YCbCr luminance color difference signals to a face and light-shielding portion detection unit 205. The face and light-shielding portion detection unit 205 detects the face region of a person and a light-shielding portion (for example, sunglasses that reduce light transmissivity) in a visible light image from the YCbCr luminance color difference signals. The result of detecting the face region and the light-shielding portion by the face and light-shielding portion detection unit 205 is output as coordinate information of the pixel positions of the eye and the light-shielding portion to an iris estimation unit 206 along with the visible light image signals of the peripheral region of the eye. Moreover, the YCbCr luminance color difference signals output from the visible light image processing unit 203 are output to a composition processing unit 207.

Next, infrared light image processing blocks and a signal processing flow in the image processing unit 8 will be described.

Infrared light image signals output from the infrared light image sensor 7 are processed by an infrared light image signal processing unit 202 so as to generate image signals including only luminance signals Y, which are output to an infrared light image processing unit 204. The infrared light image processing unit 204 executes image processing such as gamma correction on the image signals including only luminance signals Y, and outputs the image signals including only luminance signals Y to the iris estimation unit 206.

The iris estimation unit 206 estimates the color of the iris portion of the eye from the coordinate information of the pixel positions of the eye and the light-shielding portion that was obtained by the face and light-shielding portion detection unit 205, as well as from the infrared light image signals, generates visible light image signals obtained by adding the estimated iris color to the iris portion in the visible light image of the peripheral region of the eye that was output from the face and light-shielding portion detection unit 205, and outputs the visible light image signals to the composition processing unit 207.

The composition processing unit 207 outputs a composite image obtained by combining the visible light image signals of the peripheral region of the eye obtained from the iris estimation unit 206 and the visible light image signals of regions other than the peripheral region of the eye in the visible light image signals obtained from the face and light-shielding portion detection unit 205.

Note that in this embodiment, the color space of the visible light images is YCbCr, but another color space such as RGB or YUV may be used.

Image Processing

Next, processing by the image processing unit of this embodiment will be described with reference to FIGS. 3 to 6B.

Figure 3:
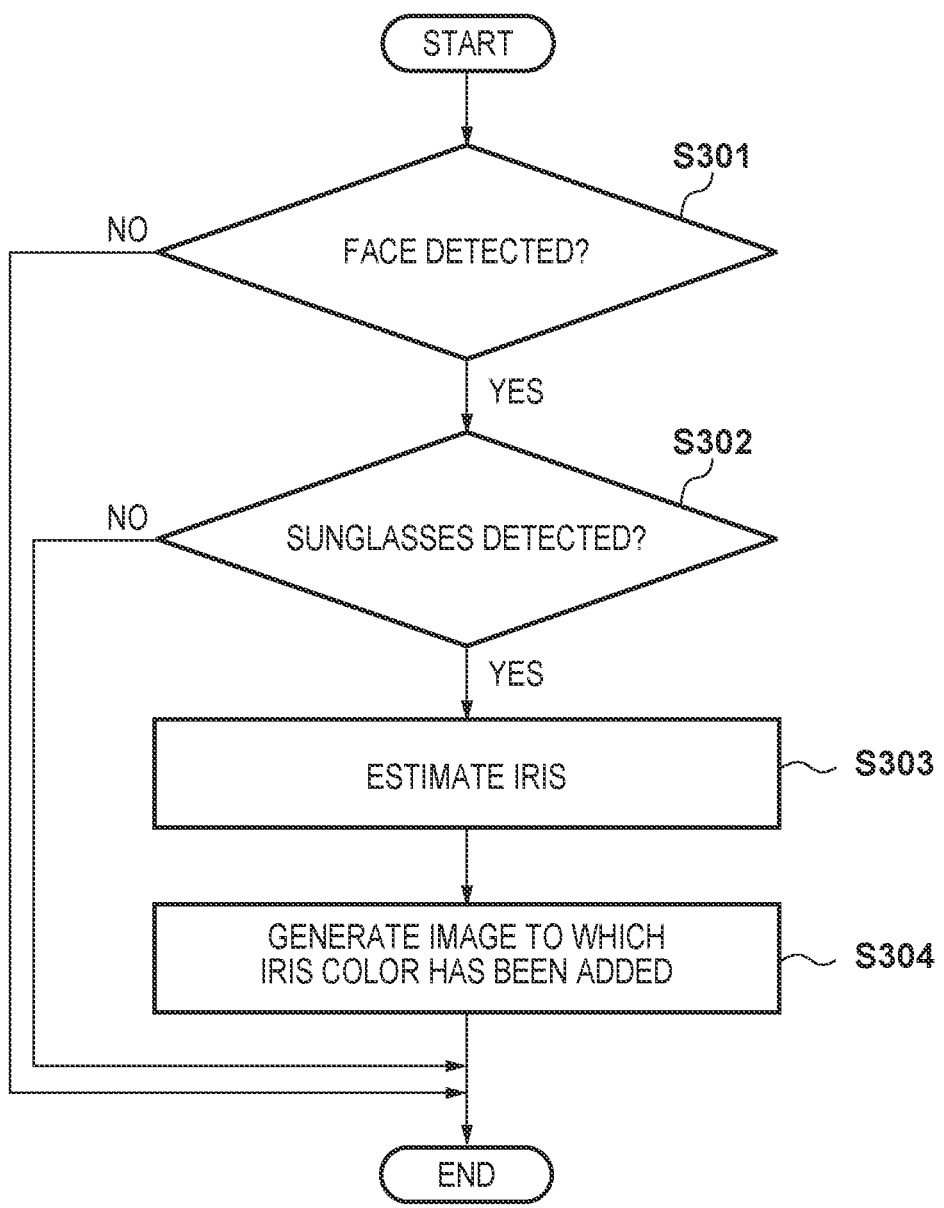
FIG. 3 is a flowchart showing image processing of this embodiment.
Figure 4:
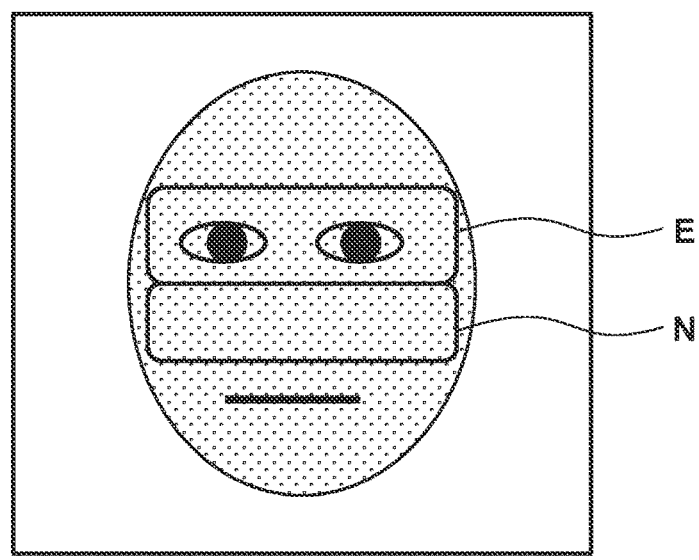
FIG. 4 is a diagram for describing a method for detecting sunglasses.

FIG. 3 shows an image processing procedure that is performed by the image processing unit 8 of this embodiment, and that is realized by the control unit 9 reading out a program stored in a memory and executing the program so as to control the image processing unit 8. Also, the processing in FIG. 3 is executed in the case where, for example, the digital camera is set to a camera mode and a captured image is output to the outside. Note that in this embodiment, the image processing unit 8 is constituted so as to be separate from the control unit 9, but a configuration may be adopted in which the image processing unit 8 is implemented in the control unit 9 or in an external computer (not illustrated).

In addition, as described above, assume that visible light image signals output from the visible light image processing unit 203 to the face and light-shielding portion detection unit 205 are YCbCr luminance color difference signals, and infrared light image signals output from the infrared light image processing unit 204 to the iris estimation unit 206 include only luminance signals Y. Moreover, assume that image signals output from the face and light-shielding portion detection unit 205 and the iris estimation unit 206 to the composition processing unit 207 are YCbCr luminance color difference signals, and specifically, the visible light image signals of the entire image are output from the face and light-shielding portion detection unit 205, and the image signals output from the iris estimation unit 206 are the visible light image signals of the peripheral region of the eye.

In step S301, in the image processing unit 8, the face and light-shielding portion detection unit 205 detects the face region of a person in a visible light image. As face detection processing, there is a method using a unique face (eigenface) obtained by main component analysis. This method is described in "Face recognition using eigenfaces", M. A. Turk and A. P. Pentland, Proc. of IEEE Conf. on Computer Vision and Pattern Recognition, pp. 586-591, 1991. Also, as described in Japanese Patent Laid-Open No. 9-251534, face detection processing may be performed by a method using feature points such as eyes, a nose, and a mouth. In these methods, whether or not an input image is a face of a person is determined by a pattern matching method for matching the input image and a plurality of standard patterns. Results of face detection in the face detection processing include information on the feature points in a face image (the outline shapes of a nose, a mouth and a face, the shape and color of the frame of sunglasses, the shape and color of a hat, and the sizes thereof, the positions of the feature points, and the like). Note that face detection processing can be realized by the above-described known techniques, and thus detailed description thereof is omitted.

In the case where a face is detected in step S301, the procedure is advanced to step S302, and in the case where a face is not detected, visible light image signals are output and this processing is ended.

In step S302, in the image processing unit 8, the face and light-shielding portion detection unit 205 detects sunglasses that exist as a light-shielding portion in the visible light image. Here, a method for detecting sunglasses will be described with reference to FIG. 4. A region E that corresponds to an eye in the face region detected in step S301 is set, and a region N that has the same size as the region E, is adjacent to the lower side of the region E and corresponds to a nose and cheeks is set. The luminance average values of these two regions E and N are respectively denoted by Ie and In, and the ratio Ie/In is compared to a threshold value. In the case where the ratio Ie/In is smaller than the threshold value, it is determined that sunglasses exist, and in the case where the ratio Ie/In is greater than the threshold value, it is determined that sunglasses do not exist.

In the case where sunglasses are detected in step S302, the procedure is advanced to step S303, and in the case where sunglasses are not detected, visible light image signals are output, and this processing is ended.

Figure 5:
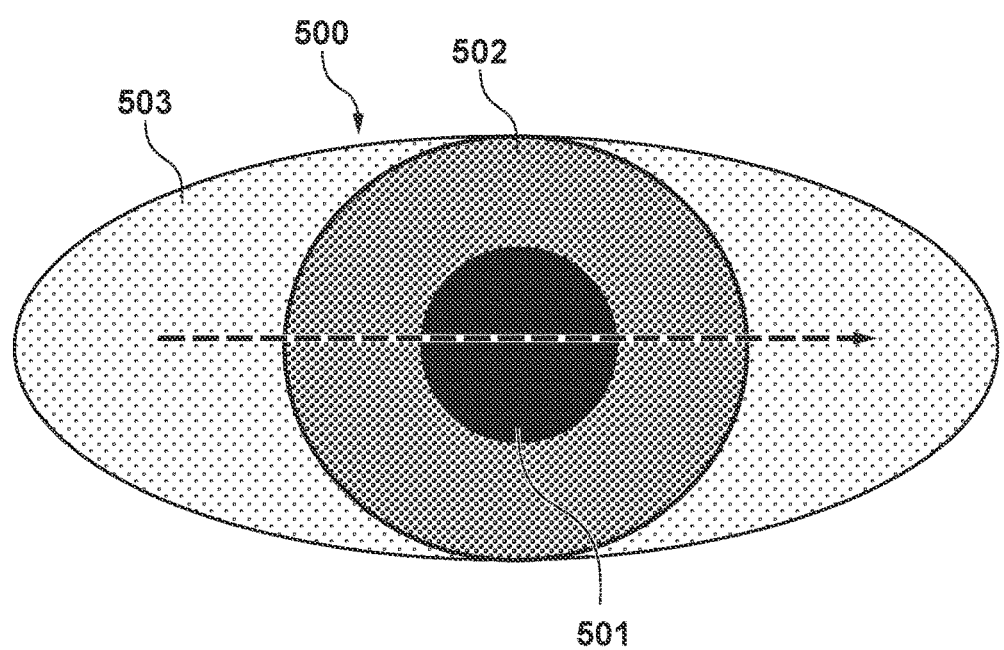
FIG. 5 is a diagram for describing a method for estimating an iris according to this embodiment.

In step S303, in the image processing unit 8, the iris estimation unit 206 performs estimation of the iris color. A method for estimating the iris color will be described with reference to FIGS. 5, 6A and 6B. First, the iris estimation unit 206 extracts a region corresponding to the eye from an infrared light image corresponding to the same position as the face region detected in the visible light image in step S301. A region 500 of one of the eyes extracted in this manner is shown in FIG. 5. The eye region 500 includes a pupil 501, an iris 502 surrounding the pupil 501, and a sclera (white portion) 503 surrounding the iris 502. In the visible light image, in the case where the eyes are covered with a light-shielding portion such as sunglasses, it is difficult to extract the eye region 500, but in the infrared light image, it is possible to extract the eye region 500.

Next, a portion corresponding to the pupil 501 is extracted from the eye region 500 that was extracted. The pupil 501 is a region that appears the darkest in the eye region 500 and is approximately 3 to 4 cm. The size of the pupil 501 is substantially known as described above, and thus it is possible to estimate, from the size of the detected face, the number of pixels that corresponds to the size of the pupil 501. In addition, the pupil 501 is a region that appears the darkest in the face, and thus can be detected by extracting the darkest region near the center of the eye.

Figure 6A:
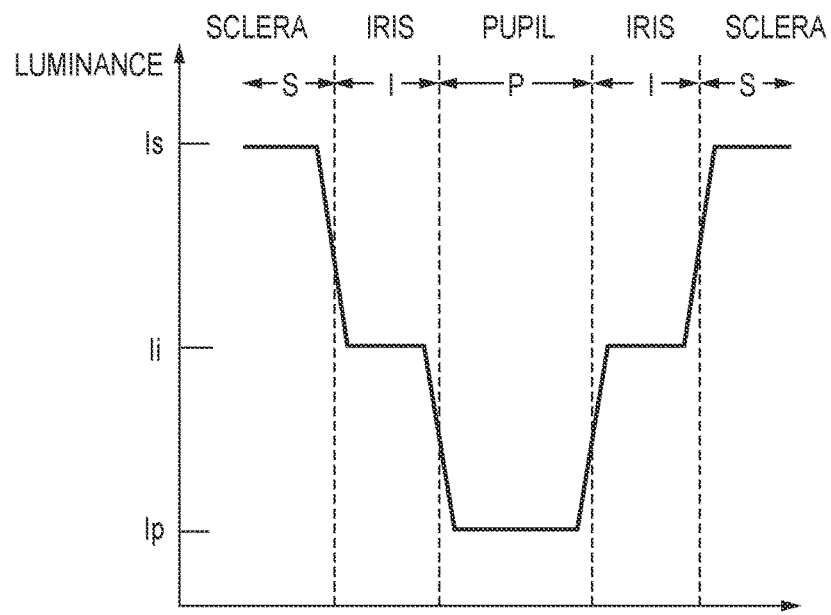
FIGS. 6A and 6B are diagrams for describing a luminance profile used for iris estimation according to this embodiment.
Figure 6B:
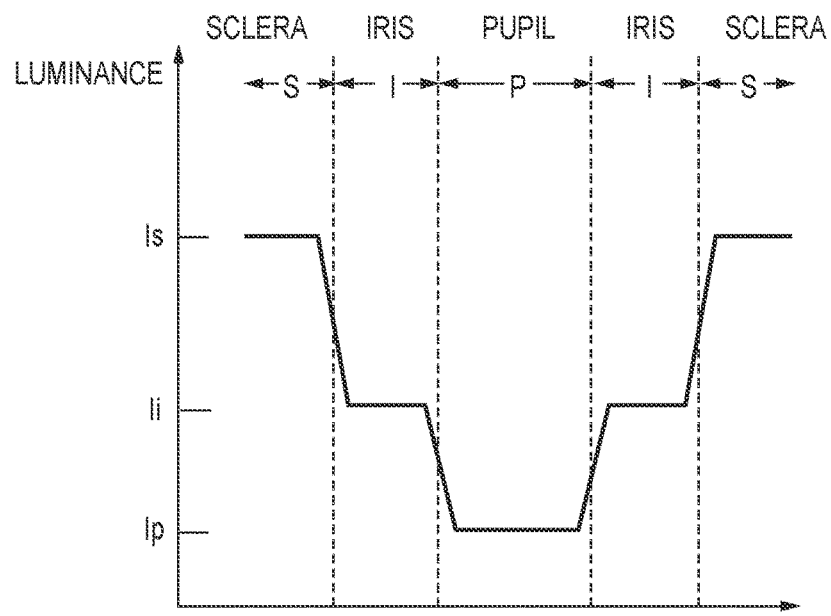

Next, a luminance value profile for the extracted eye region 500 is generated in the vertical direction indicated by broken lines in FIGS. 6A and 6B. The luminance profile generated in this manner is indicated by a solid line in FIGS. 6A and 6B. FIGS. 6A and 6B illustrate the luminance profiles when a person, who is the same object, wears sunglasses and does not wear sunglasses, where FIG. 6A indicates a luminance profile when sunglasses are not worn (uncovered eyes), and FIG. 6B indicates a luminance profile when sunglasses are worn.

In FIGS. 6A and 6B, the luminance value of a portion corresponding to the sclera 503 is the highest, the luminance value of a portion corresponding to the iris 502 is the second highest, and the luminance value of a portion corresponding to the pupil 501 is the lowest. Here, the luminance values when sunglasses are worn (FIG. 6B) are lower over the entire area of the luminance profile compared to the luminance values when sunglasses are not worn (FIG. 6A). Therefore, it can be seen that the absolute value of the luminance value of the portion corresponding to the iris 502 varies. On the other hand, the ratios of the luminance value of the sclera 503 and the luminance value of the iris 502 to the luminance value of the portion corresponding to the pupil 501 have a small difference between when sunglasses are worn and when sunglasses are not worn. Specifically, although the distribution of the luminance value decreases when sunglasses are worn, the ratios of the luminance value of the pupil to respective portions such as the iris and the sclera do not significantly change, and thus it can be seen that the ratio of the difference in luminance value between the pupil and the sclera to the difference in luminance value between the pupil and the iris is maintained.

In view of this, in this embodiment, an edge portion (a boundary indicated by a broken line in FIGS. 6A and 6B) between the sclera and iris and an edge portion (a boundary indicated by a broken line in FIGS. 6A and 6B) between the iris and pupil are individually detected from the luminance profile in FIGS. 6A and 6B, and in accordance with the detected edge portions, the luminance profile is divided into three areas, namely a sclera area S, an iris area I, and a pupil area P, and the average luminance values Is, Ii and Ip of the respective areas are obtained.

An iris estimation value Pi is then obtained from the average luminance values Is, Ii and Ip of the respective sclera area, iris area and pupil area, using Expression 1 below.

$$Pi=(Ii-Ip)/(Is-Ip) \quad (1)$$

In addition, if the person who is the shooting target is not gazing at the illumination light source (not illustrated), the luminance value Ip of the pupil area is a low value, and thus can be excluded from Expression 1 above, and in that case, the calculation is simplified as in Expression 2 below.

$$Pi=Ii/Is \quad (2)$$

Expression 1 above and Expression 2 above may be selectively used, namely, in the case where the illumination light source (not illustrated) is arranged at a position near the shooting optical axis of the camera in a shooting environment, Expression 1 above is used, and in the case where the illumination light source can be arranged at a position separated from the shooting optical axis, Expression 2 above is used.

Returning to FIG. 3, in step S304, in the image processing unit 8, the iris estimation unit 206 determines the iris color from the iris estimation value Pi obtained in step S303, by referencing an iris color difference component table. The iris color difference component table is shown in Table 1. This table is a table generated by recording the luminance in the infrared light wavelength band for each iris color in advance by experimentation or the like, and in accordance with the iris estimation value Pi obtained from Expression 1 or 2 above, the luminance value of the iris is scaled using the luminance values of the sclera and pupil. In this way, even if a portion of an infrared light image is shielded from light by a light-shielding portion such as sunglasses, estimation of an iris color can be performed by determining the iris color (darkness) based on the luminance values of the sclera and pupil. In addition, the above-described luminance values change due to the optical characteristics of the camera, the characteristics of the image sensor and the like, and thus the above table is generated for each camera.

TABLE 1

| Iris estimation value Pi | Cb | Cr | Estimated iris color |
|---|---|---|---|
| 0.55 or more | −15 | 18 | Brown |
| 0.35 to 0.55 | −18 | 0 | Green |
| Less than 0.35 | 15 | −20 | Blue |

The iris color estimated from the iris estimation value Pi using this table is obtained as color difference information.

The iris estimation unit 206 generates visible light image signals obtained by adding the color difference information obtained as described above to the iris portion in the visible light image of the peripheral region of the eye, and outputs the visible light image signals to the composition processing unit 207. In addition, the pupil and sclera do not have color difference information, and thus 0 is added as color difference information. Moreover, the color of the skin of a portion shielded from light by sunglasses or the like may be estimated from the color of the surrounding skin.

By the above-described processing, the region corresponding to the eye is extracted from the infrared light image corresponding to the same position as the face region detected in the visible light image, the color of the iris is estimated from the distribution of the luminance values of the eye region, and the color of the iris is added to the iris portion of the eye in the face region of the visible light image. Accordingly, in the case where there is a light-shielding portion such as sunglasses, it is difficult to extract the eye region from the visible light image, but it is possible to extract the eye region from the infrared light image, and a composite image is obtained in which the image of eyes hidden by sunglasses is combined with the face image of the person whose eyes are hidden by the sunglasses or the like and to which the color of the iris is added.

By performing person authentication (biometrics) using a composite image obtained in this manner, it becomes possible to improve person authentication accuracy even with a face image in which eyes are hidden by a light-shielding portion such as sunglasses.

Note that in this embodiment, an estimated iris color is added to image signals, but a configuration may be adopted in which the estimated iris color is separately output as metadata along with a face detection result and other image analysis results. As an example of the metadata, as shown in the rightmost column in Table 1, iris colors of brown and blue are held in association with the detected face position. In addition, any format such as XML may be used as the data format of the metadata.

Moreover, a race may be estimated instead of an iris color and be held as metadata. In this case, it is sufficient that data in which iris colors and races are associated with each other is held as a table or metadata.

As described above, according to this embodiment, even if eyes are hidden by a light-shielding portion such as sunglasses, it becomes possible to estimate an iris color, and it becomes possible to improve person authentication accuracy, compared to the case in which only a visible light image is used.

Note that in the above embodiment, detection of a face region and sunglasses is performed using a visible light image, but the detection may be performed using an infrared light image. Moreover, as a composite image, only estimated iris color difference components may be added to visible light image signals, or a configuration may be adopted in which an iris color and race that have been estimated are held as metadata. Furthermore, the present invention can be applied to still images and moving images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157506, filed Aug. 7, 2015 which is hereby incorporated by reference herein in its entirety.

What is claimed is:

1. An image capturing apparatus that can capture a visible light image and an infrared light image of the same object, the image capturing apparatus comprising:
a detection unit configured to detect a face of a person as a predetermined object and a light-shielding portion covering the face in the visible light image;
an extraction unit configured to extract luminance information of a specific portion covered by the light-shielding portion in the face of the person detected in the infrared light image by the detection unit; and
an estimation unit configured to estimate unique information of the face of the person using the luminance information extracted by the extraction unit;
wherein
the extraction unit extracts luminance information of a pupil, an iris and a sclera of an eye included in the face of the person covered by the light-shielding portion, and
the estimation unit estimates an iris color as the unique information from a relationship between the luminance information of the pupil, the iris and the sclera.

2. The apparatus according to claim 1, further comprising:
a composition unit configured to combine the iris color estimated by the estimation unit with an eye region of the face of the person in the visible light image.

3. The apparatus according to claim 1, wherein
the extraction unit extracts the luminance information of the pupil of the eye included in the face of the person, and
the estimation unit estimates the iris color from a relationship between the luminance information of the pupil and the sclera and a relationship between the luminance information of the pupil and the iris.

4. The apparatus according to claim 3, wherein
the estimation unit estimates the iris color of the eye included in the face of the person or a race, based on a ratio of luminance information of the iris to luminance information of the sclera.

5. The apparatus according to claim 4, wherein
the estimation unit estimates the iris color of the eye included in the face of the person or the race, based on a ratio of a difference between the luminance information of the iris and the pupil to a difference between the luminance information of the sclera and the pupil.

6. The apparatus according to claim 1, further comprising:
a storage unit configured to store a table or metadata indicating a relationship between luminance information of the iris and the iris color or race,
wherein the estimation unit determines the iris color or the race based on the luminance information of the iris stored in the storage unit.

7. The apparatus according to claim 1, further comprising:
a first image capturing unit configured to capture the visible light image, and a second image capturing unit configured to capture the infrared light image.

8. An image processing method of an apparatus that can capture a visible light image and an infrared light image of the same object, the method comprising:
detecting a face of a person as a predetermined object and a light-shielding portion covering the face in the visible light image;
extracting luminance information of a specific portion covered by the light-shielding portion in the face of the person detected in the infrared light image; and
estimating unique information of the face of the person using the extracted luminance information;
wherein
the extracting step extracts luminance information of a pupil, an iris and a sclera of an eye included in the face of the person covered by the light-shielding portion, and
the estimating step estimates an iris color as the unique information from a relationship between the luminance information of the pupil, the iris and the sclera.

9. A non-transitory computer-readable storage medium storing a program for causing a computer to execute an image processing method of an apparatus that can capture a visible light image and an infrared light image of the same object, the method comprising:
detecting a face of a person as a predetermined object and a light-shielding portion covering the face in the visible light image;
extracting luminance information of a specific portion covered by the light-shielding portion in the face of the person detected in the infrared light image; and estimating unique information of the face of the person using the extracted luminance information;
wherein
the extracting step extracts luminance information of a pupil, an iris and a sclera of an eye included in the face of the person covered by the light-shielding portion, and
the estimating step estimates an iris color as the unique information from a relationship between the luminance information of the pupil, the iris and the sclera.

* * * * *